May 11, 1943.	F. KIEFER	2,318,867
PRESERVATION OF COMESTIBLES
Filed Sept. 11, 1939
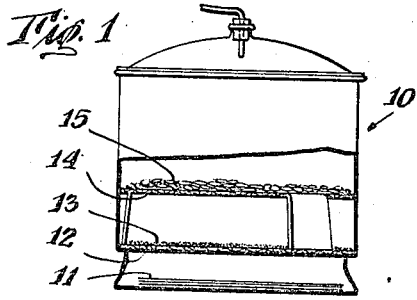
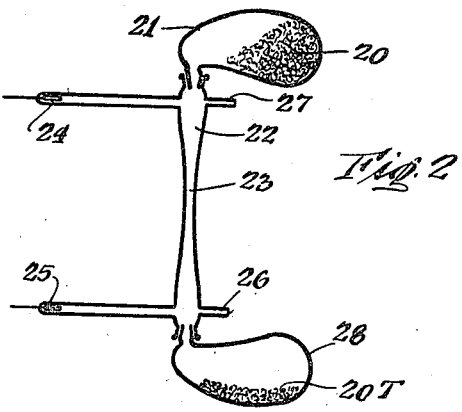
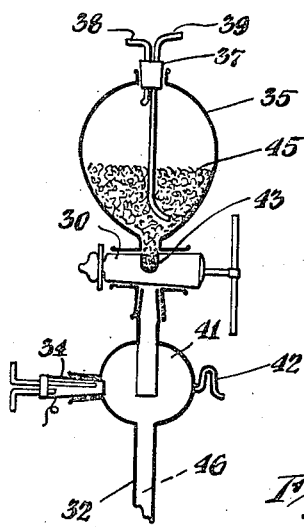
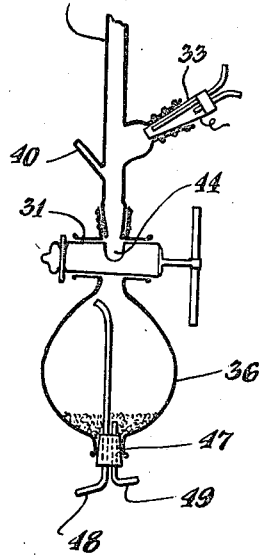
INVENTOR
Felix Kiefer
BY
Furman Rinehart
his ATTORNEY Patented May 11, 1943

2,318,867

UNITED STATES PATENT OFFICE 2,318,867

PRESERVATION OF COMESTIBLES

Felix Kiefer, Beechhurst, N. Y.

Application September 11, 1939, Serial No. 294,225

7 Claims. (Cl. 99—153)

This invention relates generally to preservation of comestibles. It relates more particularly to the treatment of products subject to oxidative deterioration and still more particularly to the treatment of comestibles susceptible to change resulting in rancidity.

It is known that many compositions of matter, including various comestibles, turn rancid. This is particularly true of the food products containing fats or fat-like substances which undergo oxidative deterioration.

I have found that active hydrogen may be caused to react with the rancid-forming substances with resulting inhibition and retardation, or complete elimination of the undesirable oxidative deterioration of food products. This invention, therefore, comprehends a process and apparatus for the treatment of comestibles to inhibit rancidification.

My researches lead me to believe that the reaction of active hydrogen may find its explanation in the chemical changes which the rancid-forming substances undergo when they become rancid. As mentioned in the foregoing, rancidity is believed to be the result of oxidative change generally characteristic of fats and more frequently of such fats which, in their chemical structure, contain one or more unsaturated groups marked by double-bonds. Rancidity is preceded by an induction period during which oxygen is adsorbed by the material without any substantial chemical reaction taking place at the outset.

The next step is marked by the combination of oxygen with the compounds containing the unsaturated link with consequent formation of a peroxide or ozonide. This step may take place under the influence of one or more catalysts which may be of an organic or inorganic nature, such as so-called enzymes, or certain metals or metal salts. Or, it may be brought about by chemically active light, such as ultraviolet, which is also part of the sunlight. Owing to the deleterious effect of active light, it has been common practice to protect products liable to oxidative deterioration by packaging them, with the purpose of keeping them in the dark or to shield them from the active light.

The peroxides and ozonides are very unstable and break apart where the oxygen addition has taken place. The ultimate result is that aldehydes, ketones and fatty acids are formed as fragments of the original fat. These, unlike the pure fats, are characterized by the odors and tastes typical of rancidity.

A somewhat different process may take place in the presence of certain bacteria which produce hydrolizing the fat, i. e. breaking it apart into fatty acids and glycerin of which it is composed. These fatty acids thus formed may then also undergo oxidative deterioration as suggested above.

From the foregoing brief explanation of the rancidification of a fat, it may be postulated where inhibitive action should set in, in order to be effective. It is, first, at the compound itself, i. e. at its unsaturated links where it may add on oxygen; and, second, at those catalytic agents which would act as helpmates of the oxygen in its destructive action.

A still further approach, which, however, serves only in specific cases, is to destroy the bacteria heretofore mentioned in order to inhibit any lipolytic action originating indirectly from them.

With the foregoing in view, I aim according to the invention to cause a reaction between the rancid-forming substances whereby they may become stable against undesirable combination with oxygen. To accomplish the desirable results comprehended by the invention, I treat the products containing the rancid-forming substances with active hydrogen in order to bring about the desired reaction.

I believe further that when active hydrogen is brought into contact with some of the products which are subject to such oxidative deterioration as hereinbefore mentioned, it launches a severe attack at the catalytic agencies present in the deteriorative product; first, by reacting with substantially every trace of oxygen adsorbed in it; and, second, by reacting in certain cases with the catalysts themselves. Thus, the catalysts are rendered impotent to perform their usual function.

I have set forth an hypothesis for a theoretical explanation underlying my invention, and it will be understood that it is what I presently believe in the light of my researches. But whatever conclusion may be reached as to the possible mechanism, chemical, physical or both, involved, my invention comprehends the protective and preserving effect of the treatment of compositions of matter with active hydrogen to inhibit, retard or entirely eliminate oxidative deterioration or rancidification.

It will be understood in this connection that the term "active hydrogen" is intended to connote that form of hydrogen in which it can react directly with other elements or substances. While it is somewhat a matter of academic debate or discussion, it has been mostly identified with nascent hydrogen and with atomic hydrogen. But the various ways in which investigators have arrived at the form of active hydrogen is suggested by a number of different designations formulated as follows: H, $H^+$, $H_2^+$, $H_3$.

Nascent hydrogen or hydrogen ion is obtained, for example, when hydrogen is generated by chemical decomposition, such as from iron and hydrochloric acid. Atomic hydrogen is formed, for example, when molecular hydrogen is bombarded with electrons or active rays, whereby to break apart the molecules. The other forms may be more a matter of speculation; $H_2^+$ having been assumed to exist near the cathode in a low voltage discharge tube. $H_3$ has been considered as a rearrangement product of hydrogen under high voltage discharge at moderate vacuum. It is so written because of its resemblance, as to high reactivity, to ozone.

I have obtained active hydrogen mostly from a class of substances which may be contacted with food-stuffs without forming therein any deleterious foreign constituent. These comprise alkali and alkaline-earth metals, including magnesium, and their hydrides (as far as they exist). They may be brought to reaction with water, leaving only as residues the respective oxides or hydroxides; but it may be desirable, in order to prevent or avoid any basic effect, to neutralize them by adding either an acid or an ammonium salt whose acid rest combines with the basic hydroxide leaving the ammonia, freed in the reaction, to escape. Ammonium-chloride has been found to serve this purpose best in connection with sodium or sodium hydride because the resulting residue, common salt, is harmless from the standpoint of edibility.

While, in direct contact with comestibles, sodium and its hydride and calcium and its hydride, as well as magnesium have been found preferable as agents for obtaining therefrom or therewith active hydrogen, and while the hydrides are especially desirable because in their decomposition with water a quantity of hydrogen is released equal to twice that generated by the respective metals, I have found that any reaction mixture whereby nascent hydrogen is generated may be used. This is based on the following observation. If a solution of salt water is poured over magnesium so that the latter is covered with the liquid, hydrogen gas is generated which when escaping from the liquid is molecular. If, on the other hand, finely dispersed magnesium is thoroughly mixed with powdered salt, and through this mixture water vapor is drawn under vacuum, the nascent hydrogen which is thus generated cannot combine to molecules immediately, and remains active (atomic) at quite a distance from the locus of generation, thus permitting the treatment of materials with active hydrogen apart from contact with its source. Beside magnesium mixed with salt, I have successfully used for this purpose aluminum powder with dry sodium hydroxide, iron filings with dry sodium bisulfate, and the hydrides of sodium and calcium by themselves, all of which were brought to reaction with water vapor under vacuum and the resulting active hydrogen was used for treatment of deteriorating materials with the beneficial results according to the principles of my invention.

Also, the invention lends itself to the treatment of comestibles in various apparatuses. Moreover, it is applicable to all manner of products susceptible to oxidative deterioration for the purpose of retarding or preventing subsequent rancidification of the products so treated. The products may be brought into reactive contact with active hydrogen formed by subjecting hydrogen gas to various forms of electric discharges; or by passing it over certain incandescent metals. And it may be stated that other gases or vapors, such as water vapor, ammonia, the lower alcohols and the like, when subjected to the same treatment yield also active hydrogen, and they may for this reason be used with the same benefit to the treatment of deteriorative comestibles. Generally, the best results are obtained when working at reduced pressure which also makes it possible to draw active hydrogen to a location at a distance from its locus of generation, as suggested herein.

Having thus described in general the principles of my invention, I hereinafter set forth specific examples for purposes of illustration, but not in limitation.

Although the novel features which are believed to be characteristic of this invention will be particularly pointed out in the claims appended hereto, the invention itself, as to its objects and advantages, and the manner in which it may be carried out, may be better understood by referring to the description with reference to certain of the following examples taken in connection with the accompanying drawing forming a part hereof, in which Fig. 1 is a view in elevation of a vacuum desiccator;

Fig. 2 is a view in elevation of an electric discharge apparatus in which the invention may be practised; and Fig. 3 is a view of a different form of electric discharge apparatus.

The following examples also serve to show the practical results of inhibition and retardation of rancidification obtainable according to the invention.

*Example I*

I have taken a sample of one pound of sweet creamery butter and divided it into two equal parts. The one half equal part, which I will call the control, I placed in a mortar and mashed it about with a pestle for about two minutes. The other half equal part, which I will call the treated half, I also placed in a mortar and mashed it about for about one minute. Then to this half I added 0.03% by weight of powdered calcium hydride which I mixed thoroughly with the butter by continuing the mashing for another minute. I placed the control sample in a screw top bottle and the treated half in another like screw top bottle. Both samples in the bottles were then placed in a dark cool room of 10°–15° C.

The untreated control sample showed signs of rancidity after seven days, at which time the treated sample had a perfect flavor and aroma. After seven weeks the samples were removed from the cold storage and kept at room temperature. After seven more days at room temperature and high summer heat, the control or untreated sample was strongly rancid, whereas the treated sample still retained its fresh odor and taste.

After prolonged standing at high room temperature, the rancidity of the untreated control underwent various accentuated phases, whereas the treated sample retained an edible character for at least three more weeks although, because of frequent opening of the bottles for the purposes of testing, its odor gradually lost its freshness.

Example II

An almost identical procedure, as outlined in Example I, was followed in the treatment of a one pound sample of vegetable margarine. In this instance 0.05% by weight of powdered calcium hydride was mixed with the treated half, and both the control half and the treated half were kept at room temperature throughout, each in its respective screw top bottle.

After seven days the untreated control sample was slightly "off" flavor and sour. The treated sample was perfect. The odor of the control sample grew gradually worse, and after two months it had formed a solid crust on top, of slightly yellow color, whereas the treated sample kept its perfect odor and taste, and neither did it harden nor discolor.

Example III

A quantity of whole dry milk (powdered milk) was divided into two equal parts. The one half, the control or untreated part, was shaken in a large sterile bottle for one minute. This control half was then divided by transferring it to small sterile bottles. The other half, the treated part, was placed in a large sterile bottle and shaken for one minute after 0.05% by weight of finely powdered calcium hydride had been added. The treated part then was likewise divided by transferring it to small sterile bottles. All samples were kept in the dark at room temperature.

After three days the control or untreated samples had a slightly rancid taste and odor. The treated samples remained normal as to taste and odor. After two and one-half months the control samples showed a great deterioration of flavor and odor, whereas the treated samples retained normal taste and odor.

Example IV

A quantity of potato chips was vacuum-dried at 60°–70° C. for 48 hours. They were divided into two parts, a smaller one, the control sample, designated (a); and a larger one, serving for two treated samples, designated (b) and (c) respectively.

The control sample (a) was placed in an otherwise empty vacuum desiccator of the type shown in Fig. 1. Sample including (b) and (c) was also placed in a like vacuum desiccator, as shown in Fig. 1. On the bottom of the desiccator, designated generally by the reference character 10, was placed a paper pad 11 moistened with water. About one to two inches above the pad 11 was placed an imperforate tray 12 upon which was spread a mixture of aluminum powder, sodium hydroxide and calcium hydride, indicated by reference character 13. About one inch above these reagents was placed a wire ring spanned with cheese cloth 14 upon which was placed the sample (including b and c) of potato chips, indicated by reference character 15. It will be observed that there was no direct contact between the moistened pad, the chemical reagents and the potato chips.

It will be further understood that sample (a) was suspended in its desiccator in like fashion as described in connection with samples (b) and (c), except that the reagents and moistened pad were lacking. The two desiccators were then connected with the vacuum line and put under partial vacuum simultaneously. After one hour under vacuum, half of the sample designated (b) was removed and transferred to a sample bottle. The remaining half of the treated sample designated (c) was left in its desiccator under vacuum for a period of 24 hours. Control sample (a) was also left in its desiccator under vacuum for a like period. Then both samples (a) and (c) were removed from the desiccators and each transferred to their respective sample bottles, as in the case of sample (b).

All samples—the treated (b) and (c), and the control (a), were again dried under vacuum at 65°–70° C. for 24 hours, and then stored in an incubator at 60° C.

After five days the control sample showed signs of deterioration, whereas the treated samples retained their freshness. After fourteen days the control sample was nearly rancid, and after eighteen days was badly rancid, whereas both treated samples were free of rancid odor or taste. There was very little difference noted between the two treated samples (b) and (c), and in general it seemed that the shorter treatment accorded (b) was sufficient and yielded a more satisfactory result than the longer treatment accorded (c).

By way of further explanation, it will be observed that, upon creating a partial vacuum in the desiccator containing the moistened pad and chemical reagents, the vapor pressure of the water was sufficient to carry the moisture into reactive contact with the reagents to form nascent hydrogen which in turn was caused to come into reactive contact with the rancid-forming substances of the potato chips.

Example V

Toasted wheat flakes were subjected to the same treatment as described in Example IV in connection with potato chips except that calcium hydride only was used as the chemical reagent reacting with the water vapor. A like result was noted. The inhibition of rancidification or stabilization expressed in the time margin during which the treated samples were free from rancidity beyond the control samples amounted to 100% and more.

Use of sodium hydride in place of calcium hydride as the chemical reagent produced, as might be expected in accordance with the invention, like results.

Example VI

This example shows the stabilization treatment applied during the process of manufacture of toasted wheat flakes. It is to be understood that "stabilization" refers to inhibition of rancidification.

Generally speaking, this cereal is prepared by mixing wheat with a flavoring syrup and cooking it under pressure and heat with direct steam, after which the resulting product is rolled and toasted.

In manufacturing this toasted cereal wheat flakes according to the invention, I have used a finely divided sodium hydride dispersed in about the same weight of paraffin. Sodium hydride so dispersed is relatively slow to react and small lumps may be placed under water without apparent violent decomposition. The paraffin product has the additional advantage that it may be broken down on a grater to bits of fairly small size which can easily be distributed in the material to be treated. Although there is water present in the wheat, the effective main reaction takes place only after the paraffin has been melted by the hot steam thus exposing the hydride to the moisture thereby to generate active hydrogen. The hydroxide formed may be neutralized with an equivalent quantity of HCl or NH₄Cl.

The quantities used for this process were 15 lbs. of wheat and approximately 7 lbs. of syrup. To the wheat, 0.075% of sodium hydride in the above mentioned paraffin form was added together with an equivalent weight of NH₄Cl. The wheat and reagents were mixed and placed in a rotating pressure kettle and heated with direct steam. After 10-15 minutes the syrup was added and the cooking process was continued for another hour. The wheat thus treated and cooked was then rolled and toasted in customary fashion.

The wheat flakes thus processed showed an improved resistance against rancidity over a control sample likewise prepared except that the active hydrogen treatment was lacking. By comparative test the treated sample showed an improvement in stabilization of about 250% over the control sample.

*Example VII*

This example describes the stabilization treatment applied to toasted wheat flakes after manufactured in the ordinary manner wherein the toasted cereal is brought into reactive contact with active hydrogen prepared from hydrogen gas by exposing it to an electric discharge in a modified Geissler tube (vacuum discharge tube) such as shown in Fig. 2.

The toasted and dried wheat flakes designated 20 (Fig. 2) were placed in an upper chamber 21 connected with a tube 22 providing a discharge zone 23. Suitable aluminum electrodes 24 and 25 were connected through a Jefferson luminous tube transformer (not shown) of 9000 volts and 30 milliamperes output, which in turn received its current from a 110 v. A. C. 60 cycle circuit. A hydrogen gas inlet 26 is located near the bottom end of tube 22 and connected to a suitable source (not shown) of hydrogen gas. A gas outlet port 27 is connected to a suction pump (not shown) to produce a partial vacuum in the electric discharge zone 23. A collecting chamber 28 for treated product (designated 20T) is connected to the lower end of tube 22.

To process the material 20, discharge zone is put under high vacuum (1-10 mm. Hg. residual pressure) and flushed twice or three times with hydrogen. After this, the hydrogen flow is reduced to a volume to maintain the vacuum indicated. Current is caused to flow through the electrodes 24 and 25 to provide the electric discharge in zone 23. While the discharge is passing through the tube, the cereal 20 is caused to pass through the discharge zone where it is brought into reactive contact with the active hydrogen thus produced. The treated product is collected in the lower chamber 28.

It was observed that this treatment improved the stability of the cereal against rancidification more than 100% by comparative test.

In order to treat cereal such as toasted wheat flakes with a higher moisture content, and yet to maintain a high vacuum in the discharge zone, a modified form of apparatus may be employed, such, for example, as that shown in Fig. 3. It is characterized by two large stop cocks, a feeder stop cock 30 positioned near the upper end of the apparatus, and a receiver stop cock 31 near the lower end. A tube 32 is connected with the stop cocks and is provided with an aluminum electrode 33 near its lower end and an aluminum electrode 34 near its upper end. The electrodes are connected to a suitable source of current through a transformer (not shown) as described in the foregoing. The upper stop cock 30 is connected to a material supply chamber 35 and the lower stop cock 31 is connected to a receiving chamber 36 for treated material. The feed chamber 36 is normally closed by a stopper 37. It is provided with an hydrogen inlet port 38 and an outlet port 39 which may be connected to a suction pump (not shown).

Near the lower end of tube 32 is provided a hydrogen gas feed port 40, which may be connected to a suitable source of hydrogen (not shown). The upper end of the tube 32 is provided with an expanded part providing a surge chamber 41 to which the electrode 34 is connected. The chamber 41 is also provided with a gas outlet port 42 which may be connected with a suction pump (not shown). Stop cock 30 is provided with a feed cup 43, and stop cock 31 with a receiving cup 44.

This device may be operated as follows: Material 45 to be treated is placed in the chamber 35 and closed by the stopper 37. Chamber 35 may be flushed with hydrogen gas through inlet port 38 and then put and maintained under vacuum.

Hydrogen gas is passed into tube 32 through port 40 and the discharge zone 46. The tube is maintained under vacuum as described in the foregoing. Suitable current is passed through the electrodes 33 and 34, thus to provide the electric discharge zone. A quantity of material under vacuum is collected in the feeding cup 43 from which it may be transferred under vacuum to the discharge zone 46 by turning the stem of stop cock 30. Thus there is provided a transfer mechanism from the charging chamber under vacuum to the vacuum tube where it is caused to pass through the discharge zone into reactive contact with the active hydrogen therein. The treated material may be collected in receiving cup 44 from whence it may be transferred to the receiving chamber 36 for the treated product without materially disturbing the vacuum in the discharge tube 32. If desired, the receiving chamber 36 may be maintained under vacuum by means of stopper 47 and ports 48 and 49 connected to a suitable source of vacuum.

This apparatus has been successfully used for the treatment not only of cereal flakes to improve stabilization against rancidification, but also for the treatment to improve the stability of dry milk and ground roasted coffee.

The foregoing examples are only a few of a large number of treatments which were applied to products not mentioned in these examples. A description of their treatments is deemed unnecessary because it would be a substantial duplication or repetition of what has been described. There is, however, one further field of application of my invention worthy of note. I have found that I can treat products containing fatty materials, which already show signs of deterioration, with active hydrogen, and thereby obtain recovery of their original fresh odor and flavor.

*Example VIII*

A quantity of whole dry milk (powdered milk), which due to exposure to heat and atmospheric oxygen had assumed a noticeable "buttery" odor, was passed through the vacuum discharge tube containing an atmosphere of hydrogen, according to a procedure described in the foregoing. After this treatment, the odor of the milk was restored to its original freshness and was maintained over a long storage period. The same effect was noted by treating the partially deteriorated milk with 0.05% calcium hydride.

It will be seen from the foregoing description that my invention comprehends the treatment of comestibles and the like, which contain rancid-forming substances, by bringing them into reactive contact with active hydrogen. Various ways and means are provided for the production of such active hydrogen, and various ways and means are provided for bringing such active hydrogen into reactive contact with the rancid-forming substances contained in various food products.

This application is a continuation in part of my co-pending application S/N 169,797, filed October 19, 1937.

While certain novel features of the invention have been disclosed herein, and are pointed out in the annexed claims, it will be understood that various omissions, substitutions and changes may be made by those skilled in the art without departing from the spirit of the invention.

What is claimed is:

1. In the process of preserving from oxidative deterioration a comestible composition of matter containing substance susceptible of such deterioration, the step which comprises treating such composition of matter with an alkali hydride and providing presence of water whereby active hydrogen is developed, which reacts to preserve said composition of matter from such deterioration.

2. In the process of preserving from oxidative deterioration a comestible composition of matter carrying such amounts of rancid-forming substances as to be normally subject to oxidative deterioration, the step which comprises treating such composition of matter with calcium hydride in the presence of water to cause active hydrogen to be developed which reacts with said substances to preserve said composition of matter against oxidative deterioration.

3. In the process of preserving from oxidative deterioration a comestible composition of matter carrying such amounts of rancid-forming substances as to be normally subject to oxidative deterioration, the step which comprises treating such composition of matter with sodium hydride in the presence of water to cause active hydrogen to be developed which reacts with said substances to preserve said composition of matter against oxidative deterioration.

4. In the art of manufacturing toasted cereal product, a method which includes cooking the raw cereal with flavoring components and an inorganic hydride from the class comprising alkaline metal hydrides and alkaline-earth metal hydrides in the presence of water whereby to generate active hydrogen reactive with substances carried by the cereal which normally cause the cereal to turn rancid, thereby to inhibit subsequent rancidification of the cereal after it is toasted.

5. In the art of manufacturing toasted cereal product, a method which includes cooking the raw cereal with flavoring components and sodium hydride in the presence of water whereby to generate active hydrogen reactive with substances carried by the cereal which normally cause the cereal to turn rancid, thereby to inhibit subsequent rancidification of the cereal after it is toasted.

6. In the art of manufacturing toasted cereal product, a method which includes cooking the raw cereal with flavoring components and an inorganic hydride from the class comprising alkaline metal hydrides and alkaline-earth metal hydrides in the presence of water whereby to decompose said hydride to generate active hydrogen reactive with substances carried by the cereal which normally cause the cereal to turn rancid, and an agent active to neutralize the base resulting from the decomposition of said hydride.

7. In the process of preserving from oxidative deterioration a comestible composition of matter containing an odor or taste-carrying substance susceptible of such deterioration, the step which comprises adding to such composition of matter an inorganic hydride from the group comprising alkali metal hydrides and alkaline-earth metal hydrides and providing presence of water whereby active hydrogen is developed which reacts to preserve said composition of matter from oxidative deterioration.

FELIX KIEFER.